United States Patent [19]

Simpson

[11] 4,252,383
[45] Feb. 24, 1981

[54] EARTH BORING BIT WITH ECCENTRICALLY FORMED BEARING SURFACE

[75] Inventor: Harry E. Simpson, Dallas, Tex.

[73] Assignee: Dresser Industries, Inc., Dallas, Tex.

[21] Appl. No.: 152,869

[22] Filed: May 23, 1980

Related U.S. Application Data

[63] Continuation of Ser. No. 19,997, Mar. 12, 1979, abandoned.

[51] Int. Cl.³ .......................................... F16C 17/10
[52] U.S. Cl. ................................. 308/8.2; 29/149.5 R
[58] Field of Search .................... 308/8.2, 216, 207 R, 308/202, 210, 208; 175/371; 29/149.5 R

[56] References Cited

U.S. PATENT DOCUMENTS

| 1,978,707 | 10/1934 | Gibbons | 308/216 |
| 2,444,724 | 7/1948 | Brown | 308/216 |
| 3,053,595 | 9/1962 | Dilworth | 308/216 |
| 4,061,376 | 12/1977 | Villaloboz | 308/8.2 |

Primary Examiner—Lenard A. Footland
Attorney, Agent, or Firm—Fred A. Winans

[57] ABSTRACT

A rolling cone cutter earth boring bit as provided with an improved bearing system including a hardmetal bearing surface and a space for lubricant. At least one cantilevered bearing pin extends from the arm of the bit. A rolling cone cutter is rotatably mounted on the bearing pin. The primary bearing surface of the bearing pin is provided by forming a groove in the lower bearing surface of the bearing pin and filling a portion of the groove with bearing material to form the load carrying portion of the bearing pin. The groove is eccentric to the bearing pin central axis. Bearing material is applied in the groove and is machined to coincide with the bearing pin surface on the load side. Part of the groove is left unfilled. The unfilled portion of groove serves as a lubricant reservoir in close proximity to the load side of the bearing pin.

3 Claims, 2 Drawing Figures

EARTH BORING BIT WITH ECCENTRICALLY FORMED BEARING SURFACE

This is a continuation of application Ser. No. 19,997, filed Mar. 12, 1979, now abandoned.

BACKGROUND OF THE INVENTION

The present invention relates in general to the art of earth boring and more particularly to a rotary rock bit with an improved bearing system. The present invention is especially adapted for use on that type of rotary rock bit popularly known as a three cone bit; however, its use is not restricted thereto and the bearing system of the present invention can be used in other earth boring bits wherein an improved bearing system is required.

A three cone rotary rock bit is adapted to be connected as the lower member of a rotary drill string. As the drill string is rotated the bit disintegrates the formations to form an earth borehole. The three cone rotary rock bit includes three individual arms that extend angularly downward from the main body of the bit. The lower end of each arm is shaped to form a bearing pin or journal. A rolling cone cutter is mounted upon each bearing pin (or journal) and adapted to rotate thereon. The cone cutters include cutting structure on their outer surface that serves to disintegrate the formations as the bit is rotated.

A rotary rock bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters thereby providing a longer useful lifetime for the cutters. This has resulted in the bearing system being the first to fall during the drilling operation. Consequently, a need exists for an improved bearing system to extend the useful lifetime of the bit.

DESCRIPTION OF PRIOR ART

In U.S. Pat. No. 3,746,405 to Russell L. Welton, a well drilling bit lubrication system and seal is shown. A journal bearing lubrication means and a seal cooperatively combined therewith to maintain lubrication throughout the useful life of the roller cutter of a well drilling bit, to the exclusion of foreign materials entering therein from the drilling fluids and surrounding earth formations is shown. A journal bearing of right cylinder form is provided, characterized by the formation of a strategically placed recess or recesses therein and all without subtracting from the load carrying capabilities of the bit, the assembly being retained in working condition by a single element combined with the lubrication means and assuring proper axial placement of the roller cutter.

In U.S. Pat. No. 3,890,018 to Robert D. Clamon, a rotary rock bit with wiper pad lubrication system is shown. A system is provided for circulating lubricant into the loaded contact area between the bearing pin and the rotating cutter of an earth boring bit. The cutter is mounted to rotate about the bearing pin. The cutter includes a cutter interior surface. At least one wiper pad cavity is located in the aforementioned interior surface of the cutter. A wiper pad is positioned in the wiper pad cavity and a resilient member is positioned beneath the wiper pad. As the cutter rotates, the wiper pad forces lubricant into the load area between the bearing pin and the interior surface of the cutter.

In U.S. Pat. No. 4,061,376 to Arthur A. Villaloboz, a rock bit bearing structure is shown. A rock bit has a rotary cutter cone journaled on a fixed journal bearing shaft with the radial load being taken by a cylindrical journal bearing. The friction bearing portion of the fixed shaft has a groove extending around the periphery of the shaft. The groove is filled with a bearing metal over an arc on the lower load bearing fraction of the shaft. The remaining unfilled portion of the groove is connected through a lubricant supply passage in the bit body with a pressure-compensated grease reservoir in the bit body to supply lubrication to the journal bearing.

SUMMARY OF THE INVENTION

The present invention provides a rolling cutter earth boring bit with an improved bearing surface and a space for lubricant. At least one cantilevered bearing pin extends from the arm of the bit. A rolling cone cutter is rotatably mounted on the bearing pin. The primary bearing surface of the bearing pin is provided by forming a groove in the bearing pin and filling a portion of the groove with bearing material on load side of the bearing pin. The groove is eccentric to the bearing pin central axis. Bearing material is applied in the groove and is machined to coincide with the bearing pin surface on the loaded side. A portion of the groove is left unfilled. The unfilled portion of groove serves as a lubricant reservoir in close proximity to the load side of the bearing pin. The above and other objects and advantages of the present invention will become apparent from a consideration of the following detailed description of the invention when taken in conjunction with the drawings.

DETAILED DESCRIPTION OF THE INVENTION

Figure 1:
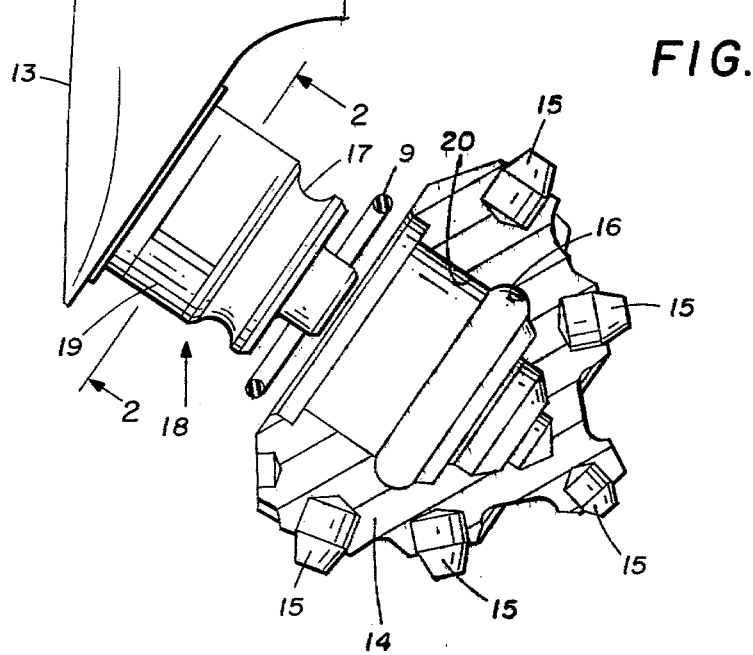
FIG. 1 illustrates a rotary rock bit constructed in accordance with the present invention.

Referring now to the drawings and to FIG. 1 in particular, shown therein and generally designed by the reference number 10 is a three cone sealed bearing rotary rock bit. The bit 10 includes a bit body 11, including an upper threaded portion 12. The threaded portion 12 allows the bit 10 to be connected to the lower end of a rotary drill string (not shown). Depending from the bit body 11 are three substantially identical arms with the arm 13 being shown in FIG. 1. The lower end of each of the arms is provided with an extended journal portion and the details of this journal portion will be discussed subsequently. Three rotary cone cutters are rotatably positioned on the three bearing pins extending from the arms. The cutter 14 is shown in FIG. 1. Each of the cutters includes cutting structure on its outer surface adapted to disintegrate formations as the bit 10 is rotated and moved downward. The cutting structure 15 is shown in the form of tungsten carbide inserts. However, it is to be understood that other cutting structures such as steel teeth may be used as a cutting structure on the cone cutters.

The bit includes a central passageway extending along the central axis of body 11 to allow drilling fluid to enter from the upper section of the drill string (not shown) immediately above and pass downward through three jet nozzles past the cone cutters. In use, the bit 10 is connected as the lower member of a rotary drill string (not shown) and lowered into the well bore until the cone cutters engage the bottom of the well bore. Upon engagement with the bottom of the well bore, the drill string is rotated, rotating bit 10 therewith. Drilling fluid is forced down through the interior passage of the rotary drill string by mud pumps located at the surface. The drilling fluid continues through the central passageway of bit 10, passing through the nozzles past the cutting structure of the cutters to the bottom of the well bore, thence upward in the annulus between the rotary drill string and the wall of the well bore, carrying with it the cuttings and debris from the drilling operation.

The bearing system must insure free rotation of the cone cutters under the severe drilling environmental conditions. The improved bearing system of the present invention provides an earth boring bit with a long lifetime and that will withstand the conditions encountered in drilling a deep well. The elongated lower portion of arm 13 forms a journal 18. The rolling cone cutter 14 is rotatably mounted on the bearing pin 18. The primary bearing surface of the bearing pin 18 is provided by forming a groove in the bearing pin and filling a portion of the groove with bearing material on the load side of the bearing pin. The groove is eccentric to the bearing pin central axis. Bearing material is applied in the groove and is machined to coincide with the bearing pin surface on the loaded side. The unfilled portion of groove serves as a lubricant reservoir in close proximity to the load side of the journal.

The bearing system of the present invention insures free rotation of rotatable cutter 14 under the severe drilling conditions. A series of ball bearings (not shown) that bridge between raceways 16 and 17 insure that rotatable cutter 14 is rotatably locked on journal 18. The rotatable cutter 14 is positioned upon journal 18 and the series of ball bearings inserted through a bore extending into arm 13. After the ball bearings are in place, a plug is inserted in the bore and welded therein. A flexible seal 9 forms a seal between cutter 14 and the journal 18 to prevent loss of lubricant or contamination of the lubricant from materials in the well bore.

Figure 2:
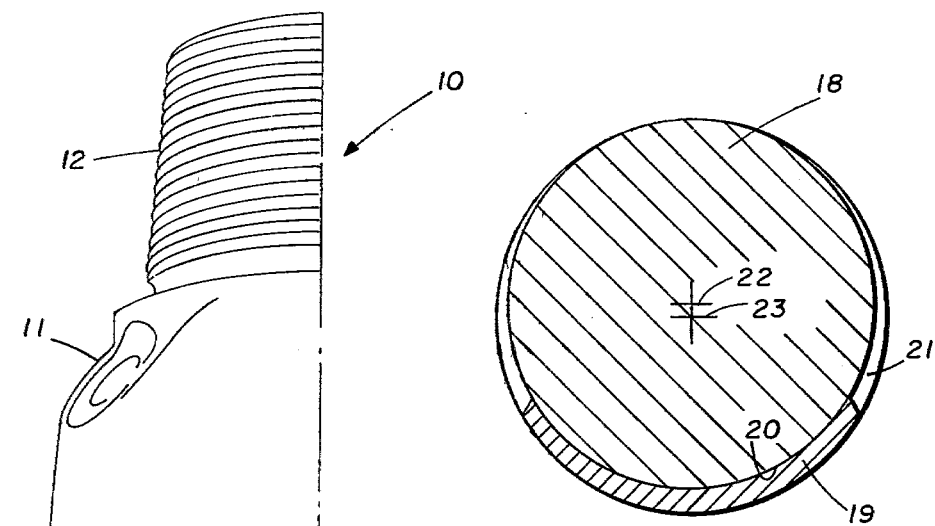
FIG. 2 is a sectional view of a rolling cone cutter of the bit of FIG. 1 taken along lines 2—2.

Referring now to FIG. 2, a sectional view of bearing pin 18 is shown. The groove 20 is cut in the journal surface. The groove 20 is eccentric to the central axis 23 of bearing pin 18 and the journal surface. Bearing material 19 is applied in the groove 20 and machined to coincide with the journal surface on the loaded side of the journal 18. A space 21 for lubricant is provided on each side of the bearing material 19. The central axis 23 of the bearing pin 18 and the axis 22 used to form the groove 20 are offset and the groove 20 is eccentric to the bearing pin 18. The unfilled portion of groove serves as a lubricant reservoir in close proximity to the load side of the journal.

The embodiments of an invention in which an exclusive property or privilege is claimed are defined as follows:

1. A method of constructing a rotary rock bit having at least one depending arm, comprising the steps of:
   producing a journal bearing pin extending cantilevered from said arm, said bearing pin having a central axis and a cylindrical bearing surface concentric thereto;
   forming a circumferentially extending groove in the peripheral bearing surface of said bearing pin of predetermined extent, less than the circumferential extent and eccentric to the central axis of the bearing pin;
   filling a first intermediate portion of said groove with a bearing material and thereby providing a pair of opposed unfilled groove portions on each side thereof;
   machining said bearing material surface to be concentric with the bearing pin surface; and
   providing said unfilled groove portions with a lubricant composition.

2. A rolling cutter earth boring bit, comprising:
   a bit body having at least one downwardly extending arm;
   a journal bearing pin extending cantilevered from said arm having a cylindrical periphery forming a bearing surface;
   a circumferentially extending groove in the peripheral surface of said bearing pin of predetermined extent less than and eccentric to the axis of the cylindrical bearing surface;
   a bearing material filling an intermediate portion of said eccentric groove and thereby providing a pair of unfilled opposed groove portions;
   a lubricant composition disposed within said opposed groove portions; and
   a rolling cone cutter rotatably mounted on said bearing pin.

3. A rolling cutter earth boring bit, comprising:
   a bit body having at least one downwardly extending arm;
   a journal bearing pin extending cantilevered from said arm, said bearing pin having a cylindrical peripheral surface about a central axis;
   a circumferentially extending groove in the lower portion of said peripheral surface of said bearing pin of a predetermined extent less than the circumference of said cylindrical surface and eccentric to said central axis;
   a bearing material filling an intermediate portion of said groove thereby providing a pair of unfilled opposed groove portions;
   a lubricant composition filling said opposed groove portions; and
   a rolling cone cutter rotatably mounted on said bearing pin.

* * * * *